United States Patent
Kashiwagi

(10) Patent No.: US 6,390,679 B1
(45) Date of Patent: May 21, 2002

(54) LINEAR GUIDE DEVICE

(75) Inventor: Shizuo Kashiwagi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/415,221

(22) Filed: Oct. 12, 1999

(30) Foreign Application Priority Data

Oct. 12, 1998 (JP) .......................................... 10-289379

(51) Int. Cl.$^7$ .............................................. F16C 29/04
(52) U.S. Cl. .......................................... 384/45; 384/44
(58) Field of Search .............................. 384/43, 44, 45

(56) References Cited

U.S. PATENT DOCUMENTS

| | | | | |
|---|---|---|---|---|
| 4,648,726 A | * | 3/1987 | Katahira ...................... | 384/45 |
| 4,806,022 A | * | 2/1989 | Takahiro ...................... | 384/45 |
| 5,145,261 A | * | 9/1992 | Narumiya .................... | 384/45 |
| 5,248,202 A | * | 9/1993 | Kawasugi et al. ........... | 384/45 |
| 5,308,168 A | * | 5/1994 | Yamaguchi et al. .......... | 384/45 |
| 5,385,406 A | * | 1/1995 | Ichida et al. ................. | 384/45 |
| 5,851,073 A | * | 12/1998 | Takeuchi ..................... | 384/45 |
| 5,927,858 A | * | 7/1999 | Agari .......................... | 384/45 |

FOREIGN PATENT DOCUMENTS

JP 63-6504 2/1988 ........... F16C/29/06

\* cited by examiner

Primary Examiner—Charles A Marmor
Assistant Examiner—Ha Ho
(74) Attorney, Agent, or Firm—Sughrue Mion, PLLC

(57) ABSTRACT

A linear guide bearing device 1, which serves as the above-mentioned linear guide device, comprises a guide rail 3 and a slider 4. The guide rail 3 includes a plurality of rolling element rolling grooves 5. The slider 4 includes a plurality of load rolling element rolling grooves 8 and a plurality of curved passages 15. The rolling grooves 5 and 8 cooperate together in forming their associated load rolling passages 11 respectively. In an area ranging over each set of the rolling element rolling passage 11 and curved passage 15, there is formed a crowning 20 in a direction where the rolling groove 8 moves away from its associated rolling groove 5. In the end portion of each curved passage 15 on the rolling groove 5 side, there is formed a tongue portion 17. The crowning 20 is structured such that, between the load rolling element 10a that belongs to the rolling elements 10 respectively rolling with a load within their associated rolling element rolling passage 11 and is situated in the end portion of the present rolling element rolling passage 11 and the tongue portion 17 of the curved passage 15, there can be present only one no-load rolling element 10b which rolls with no load.

2 Claims, 6 Drawing Sheets

LINEAR GUIDE DEVICE

BACKGROUND OF THE INVENTION

The invention relates to a linear guide device used as a linear guide in a machine tool, an industrial machine and the like.

Conventionally, as a linear guide for use in a machine tool, an industrial machine and the like, there is known a linear guide device, that is, a linear guide bearing device 51 shown in FIG. 8. The linear guide bearing device 51 shown in FIG. 8 comprise a guide rail 53 extending in one direction and serving as a guide member, and a slider 54 disposed in such a manner that it is freely movable along the longitudinal direction of the guide rail 53.

The guide rail 53 includes a plurality of rolling element rolling grooves 55 on the outer surface thereof in such a manner that they respectively extend in the longitudinal direction of the guide rail 53. And, the slider 54 includes a slider main body 56 so formed as to have a U-shaped section, and two end caps 57 respectively mounted on the two end faces of the slider main body 56; and, the slider 54 is disposed in such a manner that it strides the guide rail 53.

The slider 54 includes a plurality of load rolling element rolling grooves 58 which respectively correspond to their associated rolling element rolling grooves 55 of the guide rail 53. The rolling element rolling grooves 55 and the load rolling element rolling grooves 58 are respectively opposed to and combined with each other to thereby form their associated load rolling passages 61.

The slider 54 further includes a plurality of rolling element return passages 59 which are respectively formed in the interior portion of the slider 54 and extend substantially parallel to their associated load rolling element rolling grooves 58, and a plurality of curved passages 65 respectively connecting together the mutually associated load rolling passages 61 and rolling element return passages 59.

The above-mentioned load rolling passages 61, rolling element return passages 59 and curved passages 65 cooperate together in forming their associated rolling element circulation passages 66. Within each of the rolling element circulation passages 66, there are loaded a plurality of balls 60 serving as the rolling elements. The balls 60 are arranged in such a manner that they roll with a load within the load rolling passage 61 as well as they roll with no load within the curved passage 65 and rolling element return passage 59. Such rolling motion of the balls 60 allows the slider 54 to be freely movable along the longitudinal direction of the guide rail 53.

Also, over each set of the load rolling passage 61 and curved passage 65 of the slider 54, there is disposed a crowning 70 serving as an expansion portion which is formed in direction where the load rolling element rolling groove 58 moves away from its associated rolling element rolling groove 55. The reason why the crowning 70 is disposed is that it allows the balls 60 to circulate smoothly even if the balls 60 move into a load area such as the load rolling passage 61 from a no-load area such as the rolling element return passage 59, curved passage 65 and the like.

Further, the slider 54 includes, in the inside portions of the end caps 57 that are disposed opposed to the guide rail 53, tongue portions 67 each serving as a scooping portion (in other words, a take-up portion) which can be contacted with the balls 60 moving into the curved passage 65 from the load rolling passage 61 to thereby guide the balls 60 into the curved passage 65.

In the above-mentioned conventional linear guide bearing device 51, as shown in FIG. 8, in each crowning 70, in some cases, between the tongue portion 67 formed in the curved passage 65 and a ball 60a serving as a load rolling element which belongs to the balls 60 rolling with a load within the load rolling passage 61 and is situated in the end portion of the load rolling passage 51, there can exist an even number of balls 60b serving as no-load rolling elements which roll with no load. By the way, in FIG. 8, the balls 60b are present two in number.

At the then time, one of the two balls 60b serving as a no-load rolling element, which is situated on the right in FIG. 8 and is contacted with the tongue portion 67, rolls along a direction of an arrow line M2 shown in FIG. 8 which is the opposite direction to the rotation direction thereof in which the ball 60b runs up onto the tongue portion 67 and moves into the curved passage 65.

Due to this, the dynamical friction force of the linear guide bearing device 51 varies as in portions which are respectively enclosed by two-dot chained lines Qs shown in FIG. 9 and, actually, as the present dynamical friction force varies, the dynamical friction force of the ball 60b also increases, which raises an unfavorable problem.

By the way, in FIG. 9, the dynamical friction force of the linear guide bearing device 51, which is obtained when the linear guide bearing device 51 is moved in one direction extending along an arrow line S1 shown in FIG. 8, is shown as a positive dynamical friction force; and, on the other hand, the dynamical friction force, which is obtained when the linear guide bearing device 51 is moved in the other direction extending along an arrow line T1 shown in FIG. 8 which is the opposite direction to the arrow line S1 direction, is shown as a negative dynamical friction force.

SUMMARY OF THE INVENTION

The present invention aims at eliminating the drawbacks found in the above-mentioned conventional linear guide bearing device. Accordingly, it is an object of the invention to provide a linear guide device which not only can reduce a dynamical friction force generated when moving a guide member but also can control variations in the dynamical friction force.

In solving the above problems and attaining the above object, according to the invention, there is provided a linear guide device comprising: a guide member including a plurality of rolling element rolling grooves respectively formed in the outer surface thereof; a slider disposed on the guide member in such a manner that it is free to move along the guide member, the slider including a plurality of load rolling element rolling grooves respectively opposed to and combined with the rolling element rolling grooves of the guide member and cooperating with the rolling element rolling grooves in forming their associated load rolling passages, and a plurality of curved passages respectively connected to the thus formed load rolling passages; and, a plurality of rolling elements loaded in each of the load rolling passages and curved passages, the rolling elements not only rolling with a load within their associated load rolling passages but also rolling with no load within their associated curved passages, wherein, in an area ranging over each set of the load rolling passage and curved passage, there is formed an expansion portion extending in a direction where the load rolling element rolling groove moves away from its associated rolling element rolling groove, the expansion portion being structured such that, between the load rolling element that belongs to the load rolling elements rolling with a load within the load rolling passages and is situated in the end portion of the load rolling passage and a rolling element take-up portion formed in each of the curved passages, there can be present an odd number of no-load rolling element (elements) rolling with no load.

In other words, according to the present linear guide device, there is formed the expansion portion in such a manner that, between each curved passage and the load rolling element that belongs to the load rolling elements rolling with a load within their associated load rolling passage and is situated in the end portion of the present load rolling passage, there can be present an odd number of no-load rolling element (elements).

The no-load rolling element, which is going to move into the curved passage from the load rolling passage, is made to roll in a direction in which it can move easily into the curved passage, thereby being able not only to reduce the dynamical friction force a of the no-load rolling element generated when it moves along the guide member but also to control variations in the present dynamical friction force.

The present disclosure relates to subject matter contained in Japanese Patent Application No. Hei. 10-289379, filed on Oct. 12, 1998, and which is expressly incorporated herein by reference in its entirety.

DETAILED DESCRIPTION OF THE PREFERRED EMBODIMENTS

Now, description will be given below of the reason why the above-mentioned linear guide device is able to control the variations in the dynamical friction force as well as reduce the dynamical friction force itself, with reference to FIGS. 4 to 7.

Figure 4:
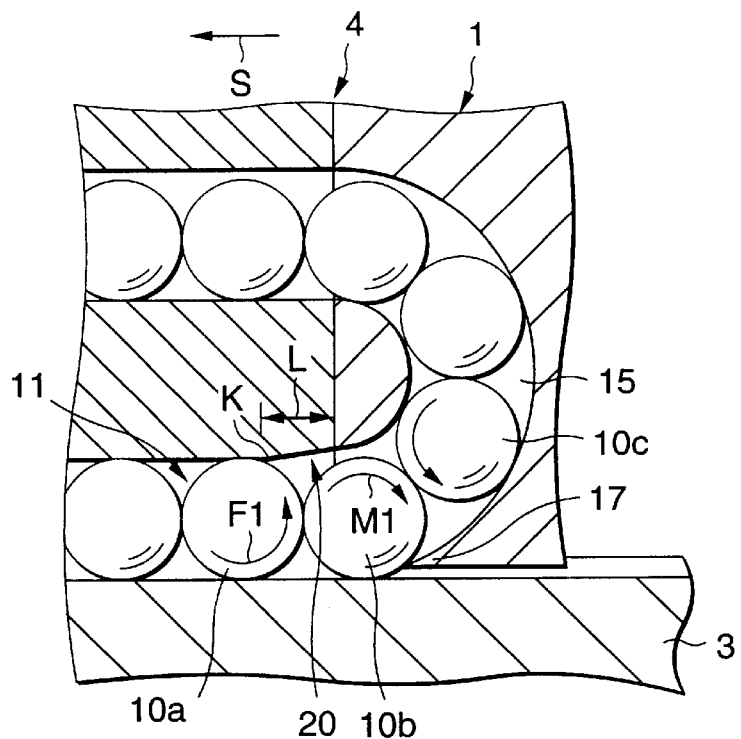
FIG. 4 is a section view of a linear guide bearing device according to the invention, showing mainly the rolling direction of a rolling element rolling over each set of the load rolling passage and curved passage of the present linear guide bearing device according to the invention.

At first, as shown in FIG. 4, in a linear guide device 1 including a slider 4 which is free to move along the longitudinal direction of a guide rail 3, when, between a load rolling element 10a situated in the end portion of a load rolling passage 11 and a tongue portion 17 which is formed in a curved passage 15 and serves as a rolling element take-up portion, there is present only one no-load rolling element 10b which should exist in an odd number, the present no-load rolling element 10b is made to roll in a direction of an arrow line M1 shown in FIG. 4 which is opposite to the rolling direction of the load rolling element 10a rolling along an arrow line F1 shown in FIG. 4 and also in which the no-load rolling element 10b is easy to move into the curved passage 15. By the way, in a state shown in FIG. 4, the slider 4 is moving along an arrow line S shown in FIG. 4.

Figure 5:
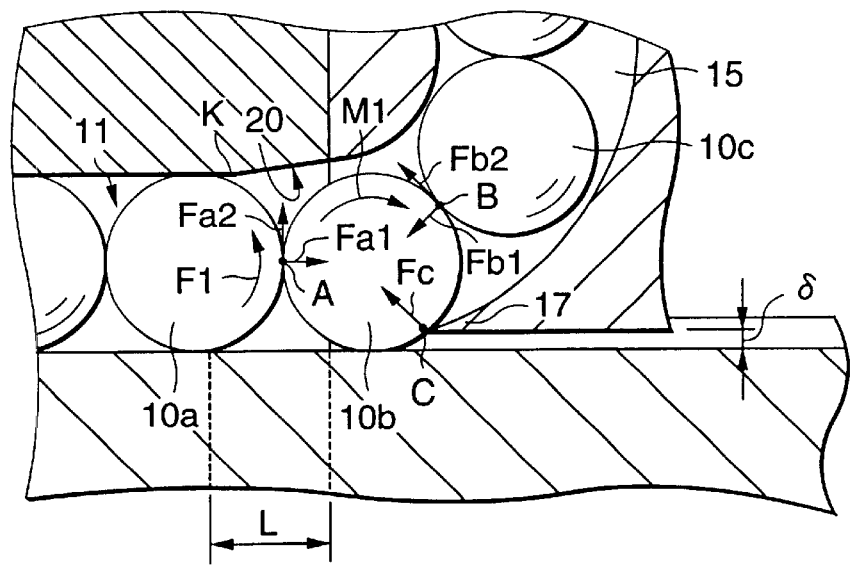
FIG. 5 is an explanatory view of forces respectively applied onto a no-load rolling element which is held in such a state as shown in FIG. 4.

When the no-load rolling member 10b comes into contact with the tongue portion 17, as shown in FIG. 5, at a point B where the no-load rolling member 10b is contacted with a rolling element 10c which has previously run up onto the tongue portion 17 and moved into the curved passage 15, there are applied onto the no-load rolling member 10b not only a reactive force going along an arrow line Fb1 shown in FIG. 5 but also a force going inwardly of the curved passage 15 along an arrow line Fb2 shown in FIG. 5, which are respectively given from the rolling element 10c.

Also, at a point C where the no-load rolling member 10b is contacted with the tongue portion 17, there is applied from the tongue portion 17 onto the no-load rolling member 10b a reactive force going inwardly of the curved passage 15 along an arrow line Fc shown in FIG. 5. Further, at a point A where the no-load rolling member 10b is contacted with the load rolling element 10a, there are applied onto the no-load rolling member 10b not only a pressing force going along an arrow line Fa1 shown in FIG. 5 but also a force going inwardly of the curved passage 15 along an arrow line Fa2 shown in FIG. 5, which are respectively given from the load rolling element 10a.

Figure 6:
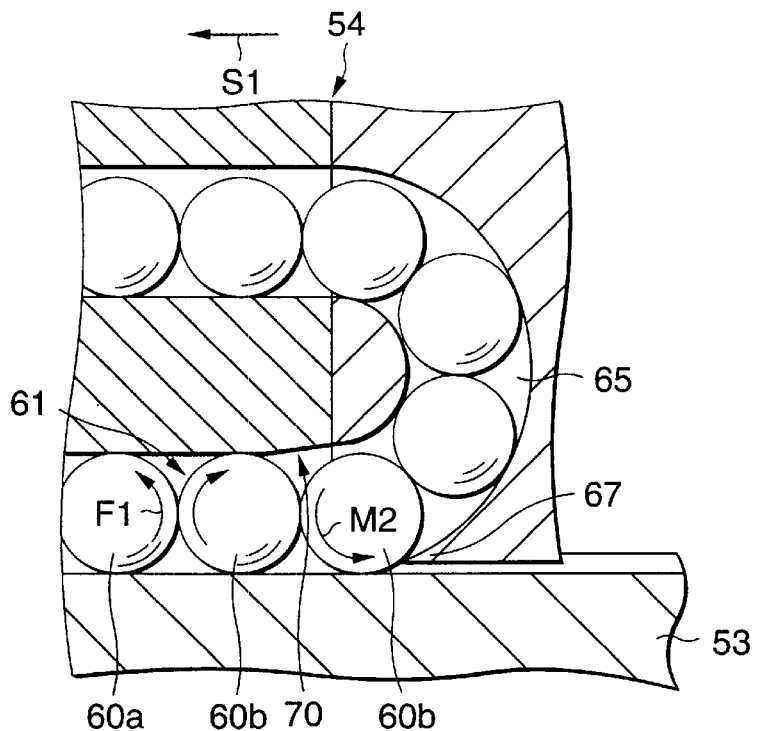
FIG. 6 is a section view of a conventional linear guide bearing device, showing mainly the rolling direction of a ball rolling over each set of the load rolling passage and curved passage of the conventional linear guide bearing device.

Next, as shown in FIG. 6, in a linear guide device 51 including a slider 54 which is free to move along the longitudinal direction of a guide rail 53, when, between a load rolling element 60a situated in the end portion of a load rolling passage 61 and a tongue portion 67 which is formed in a curved passage 65, there are present two no-load rolling elements 60b which should exist two or more in number, one of the two no-load rolling elements 60b that is situated on the curved passage 65 side is made to roll in a direction of an arrow line M2 shown in FIG. 6 which is the same direction to the rolling direction of the load rolling element 60a rolling along an arrow line F1 shown in FIG. 6, because the rotation of the load rolling element 60a is transmitted thereto through the other no-load rolling element 60b. By the way, in a state shown in FIG. 6, the slider 54 is moving along an arrow line S1 shown in FIG. 6.

Figure 7:
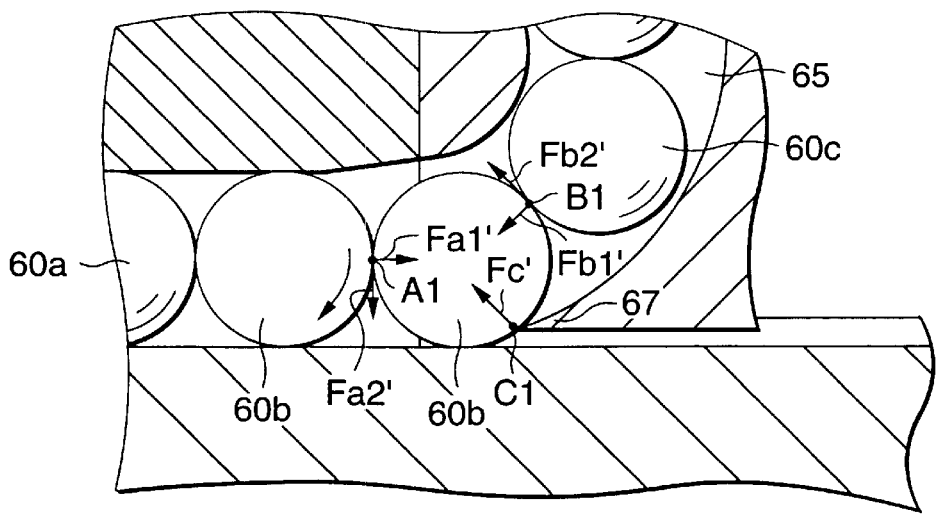
FIG. 7 is an explanatory view of forces respectively applied onto a ball serving as a no-load rolling element which is held in such a state as shown in FIG. 6.
Figure 8:
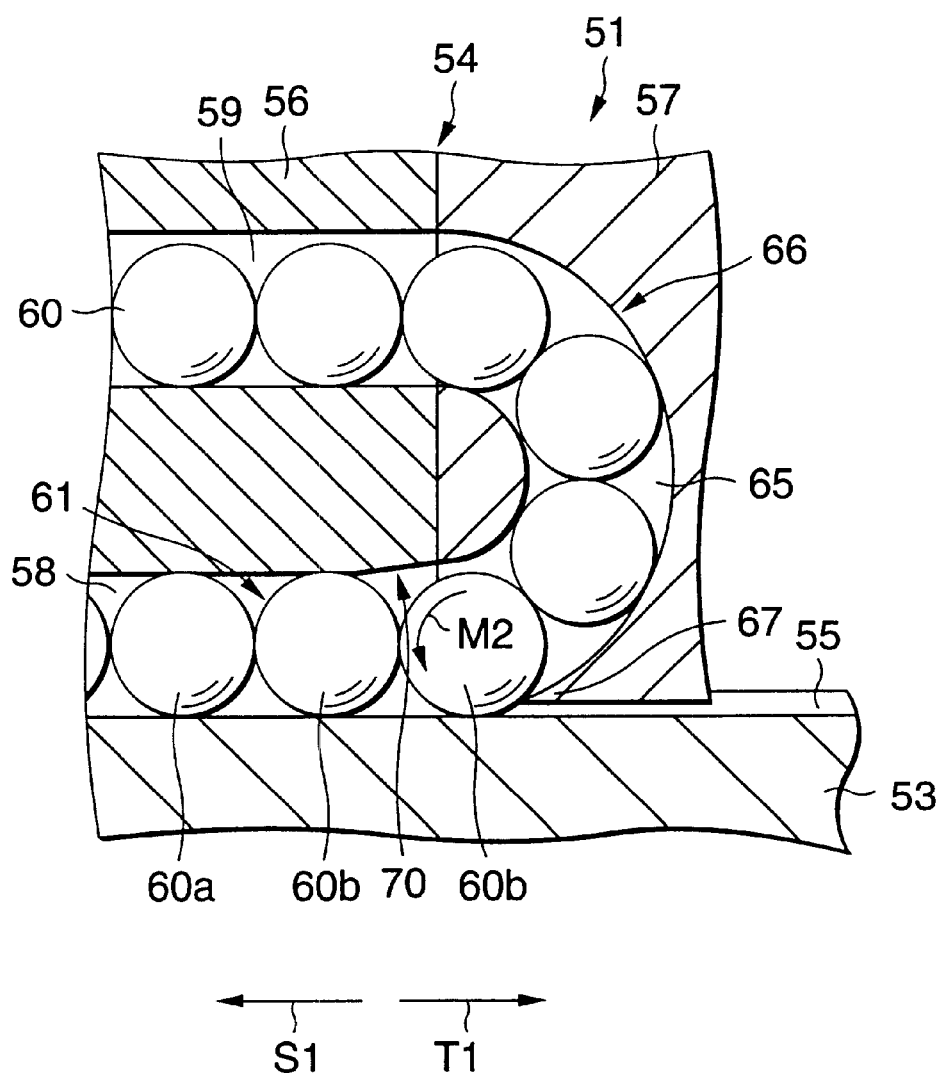
FIG. 8 is a section view of part of a conventional linear guide bearing device.

When the above-mentioned one no-load rolling member 60b comes into contact with the tongue portion 67, as shown in FIG. 7, at a point B1 where the present one no-load rolling member 60b is contacted with a rolling element 60c which has previously run up onto the tongue portion 67 and moved into the curved passage 65, there are applied onto the present one no-load rolling member 60b not only a reactive force going along an arrow line Fb1' shown in FIG. 7 but also a force going inwardly of the curved passage 65 along an arrow line Fb2' shown in FIG. 7, which are respectively given from the rolling element 60c.

Also, at a point C1 where the present one no-load rolling member 60b is contacted with the tongue portion 67, there is applied from the tongue portion 67 onto the present one no-load rolling member 60b a reactive force going inwardly of the curved passage 65 along an arrow line Fc' shown in FIG. 7. Further, at a point A1 where one no-load rolling member 60b is contacted with the other no-load rolling element 60b that is situated on the load rolling element 60a side, there are applied onto the present one no-load rolling member 60b not only a pressing force going along an arrow line Fa1' shown in FIG. 7 but also a force going outwardly of the curved passage 65 along an arrow line Fa2' shown in FIG. 7, which are respectively given from the other no-load rolling element 60b.

By the way, the reactive force going in the arrow line Fb1 shown in FIG. 5 is equal to the reactive force going in the arrow line Fb1' shown in FIG. 7, while the force Fb2 going inwardly of the curved passage 15 shown in FIG. 5 is equal to the force Fb2' going inwardly of the curved passage 65 shown in FIG. 7.

Also, at the points C and C1 respectively shown in FIGS. 5 and 7 where the no-load rolling elements 10b and 60b are respectively contacted with their associated tongue portions 17 and 67, a force necessary for the no-load rolling elements 10b and 60b to move beyond the tongue portions 17 and 67 depends on the pressing force which is given from the load rolling element 10a and goes along the arrow line Fa1 shown in FIG. 5, the pressing force which is given from the no-load rolling element 60b situated on the load rolling element 60a side and goes along the arrow line Fa1' shown in FIG. 7, the force going inwardly of the curved passage 15 along the arrow line Fa2 shown in FIG. 5, and the force going outwardly of the curved passage 65 along the arrow line Fa2' shown in FIG. 7.

Here, the relation between the pressing force Fa1 and the force Fa2 can be shown by the following equation 1, while the relation between the pressing force Fa1' and the force Fa2' can be shown by the following equation 2. Further, the ratio of the pressing force Fa1 to the pressing force Fa1' (that is, Fa1'/Fa1) can be shown by the following equation 3.

$$Fa2 = \mu \times Fa1 \qquad \text{Equation 1}$$

$$Fa2' = \mu \times Fa1' \qquad \text{Equation 2}$$

[Numerical Expression 1]

$$\frac{f_{al}^1}{f_{al}} = \frac{\left(\frac{Da}{2} \cdot \delta + \mu\sqrt{2\delta Da - \delta^2} + \frac{\mu \cdot Da}{2}\right)}{\left(\frac{Da}{2} \cdot \delta \cdot \mu\sqrt{2\delta Da - \delta^2} - \frac{\mu Da}{2}\right)} \qquad \text{Equation 3}$$

where, Da: the diameter of rolling element 10, 60, μ:a friction coefficient between rolling elements 10 and 60, δ:a clearance between tongue portion 17, 67 and guide rail 3, 53.

For example, assuming that Da=2, δ=0.2, and μ=0.1, if the ratio of the pressing force Fa1 to the pressing force Fa1' (Fa1'/Fa1) in a relatively small-sized linear guide bearing device is obtained, then there can be obtained Fa1'/Fa1=2.9. Therefore, if an odd number of no-load rolling element (elements) 10b is (are) present between the load rolling element 10a and the tongue portion 17 formed in the curved passage 15, then the force necessary for the present no-load rolling element 10b to move up onto the tongue portion 17 can be reduced down to approx. ⅓ when compared with a case where there are present an even number of no-load rolling elements 10b the load rolling element 10a and the tongue portion 17.

Thanks to this, the dynamical friction force of the slider 4 generated when the slider 4 moves along the guide rail 3 can be reduced and, at the same time, since the movement of the slider 4 can be made smooth, variations in the dynamical friction force of the slider 4 can be controlled down to a minimum.

Now, description will be given below of an embodiment of a linear guide bearing device according to the invention with reference to FIGS. 1 to 3.

Figure 1:
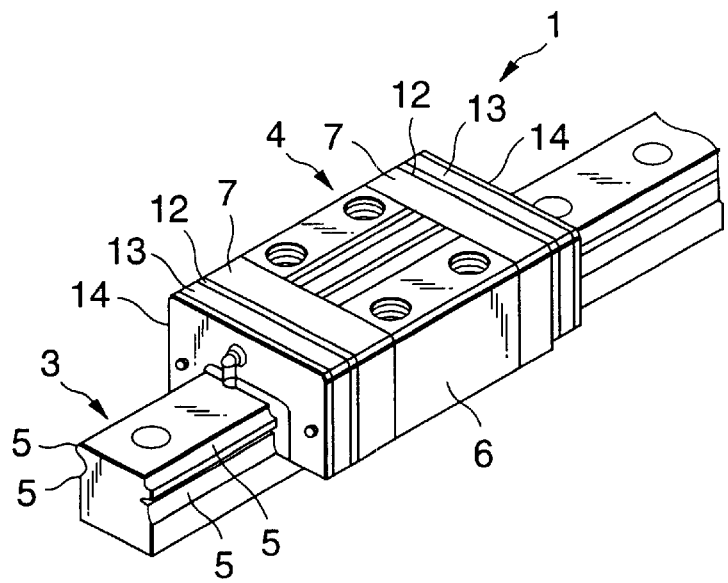
FIG. 1 is a perspective view of a linear guide bearing device according to an embodiment of the invention.

As a linear guide in a machine tool, an industrial machine, and the like, there is used a linear guide bearing device 1 shown in FIG. 1 which serves as a linear guide device. The linear guide bearing device 1, as shown in FIGS. 1 and 2, comprises a guide rail 3 which extends in one direction and serves as a guide member, and a slider 4 which has a U-shaped section and is mounted in such a manner that it straddles the guide rail 3 and is freely movable along the longitudinal direction of the guide rail 3.

The guide rail 3 includes, on the outer surface thereof, a plurality of rolling element rolling grooves 5 each of which extends along the longitudinal direction of the guide rail 3 and has an arc-shaped section, while the rolling element rolling grooves 5 respectively serve as the rolling grooves of the present linear guide bearing device 1. By the way, in the illustrated embodiment, the rolling element rolling grooves 5 are formed by twos on each of the right and left outer surfaces of the guide rail 3 with respect to the longitudinal direction of the guide rail 3, that is, in the guide rail 3, there are formed a total of four rolling element rolling grooves 5. These rolling element rolling grooves 5 are arranged substantially parallel to each other.

On the other hand, the slider 4 comprises a slider main body 6 and two end caps 7 which are respectively mounted on the two end portions of the slider main body 6. Also, starting from the near side of each end cap 7, there are mounted on each end cap 7 a reinforcing plate 12, a lubricant containing member 13, and a side seal 14 in such a manner that they are superimposed on top of another.

Figure 2:
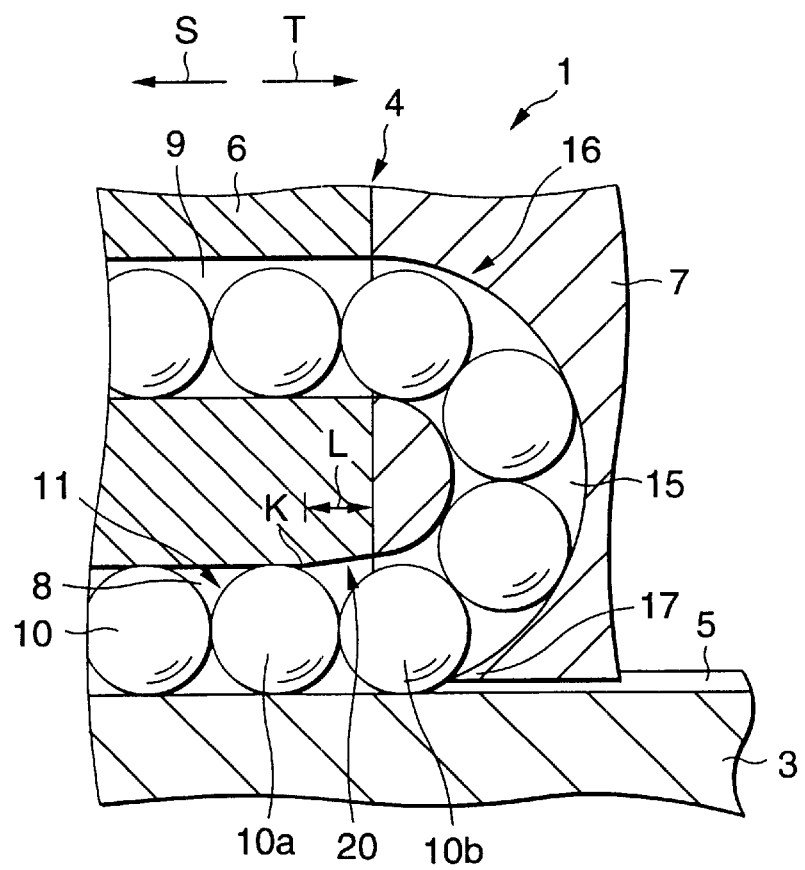
FIG. 2 is a section view of part of the linear guide bearing device according to the embodiment of the invention.

As shown in FIG. 2, the slider 4 includes, on the respective inner surfaces of the two skirt portions thereof, a plurality of load rolling element rolling grooves 8 which respectively correspond to the rolling element rolling grooves 5 of the guide rail 3. The rolling element rolling grooves 5 and load rolling element rolling grooves 8 are respectively opposed to and combined with each other to thereby form their associated load rolling passages 11.

Also, the slider 4 further includes, in the large-thickness portions of the above-mentioned two skirt portions thereof, a plurality of rolling element return passages 9 which respectively extend through the slider 4 along the longitudinal direction of the rail 3 and are respectively arranged substantially parallel to their associated load rolling element rolling grooves 8, and a plurality of curved passages 15 respectively connecting together their associated load rolling passages 11 and rolling element return passages 9.

The above-mentioned load rolling passages 11, the rolling element return passage 9 and curved passages 1S cooperate together in forming their associated rolling element circulation passages 16. Within each of the rolling element circulation passages 16, there are loaded a large number of rolling elements 10. In the illustrated embodiment, as these rolling elements 10, there are employed spherical-shaped balls which are formed of steel or ceramics.

These rolling elements 10, within their associated load rolling passages 11, roll with a load on the rolling element rolling grooves 5 and 8 as well as, within their associated rolling element return passages 9 and curved passages 15, roll slidingly with no load with respect to the inner peripheral surfaces of these passages.

That is, the rolling elements 10 roll on their associated rolling element rolling grooves 5 and 8 as well as circulate within their associated rolling element circulation passages 16, whereby the slider 4 is allowed to move freely along the longitudinal direction of the guide rail 3.

Also, the slider 4 includes, in the end portion of each curved passage 15 formed in the end cap 7 of the slider 4 that is located on the rolling element rolling groove 5 side, a tongue portion 17 which, when the rolling elements 10 are moving into their associated curved passage 15 from their associated load rolling passage 11, can be contacted with a no-load rolling elements 10b (which will be discussed later) to thereby guide the no-load rolling element 10b into its associated curved passage 15. The tongue portion 17 serves as a rolling element take-up portions that is set forth in the single claim appended to the present specification.

Further, over each set of load rolling passage 11 and curved passage 15 of the slider 4, there is arranged a crowning 20 serving as an expansion portion which is formed by enlarging the respective inside diameters of the associated load rolling passage 11 and curved passage 15, In the illustrated embodiment, each load rolling element rolling groove 8 is formed in a direction where it moves away from its associated rolling element rolling groove 5: that is, such formation of the load rolling element rolling groove 8 makes it possible to form the crowning 20.

The crowning 20, in the illustrated embodiment, is structured such that, between the load rolling element 10a that belongs to the rolling elements rolling with a load within the load rolling passage 11 and is situated in the end portion of the present load rolling passage 11 and the tongue portion 17 formed in the curved passage 15, there can be present only one of no-load rolling elements 10b which roll with no load and should exist in an odd number.

The above-mentioned crowning 20, in the illustrated embodiment, is also structured such that at least part of the rolling element 10b serving as the no-load rolling element is situated between the rolling element 10a serving as the load rolling element and the curved passage 15.

According to the above-mentioned structure, since there exists only one no-load rolling element 10b between the tongue portion 17 and the load rolling element 10a that belongs to the rolling elements 10 and is situated in the end portion of the load rolling passage 11, as shown in the above-mentioned equation 3, a force necessary for the rolling element 10b to run up onto the tongue portion 17 is about ⅓ when compared with the conventional linear guide bearing device 51 in which there are present an even number of (for example, two) no-load rolling elements 60b between the tongue portion 17 and the load rolling element 10a.

Figure 3:
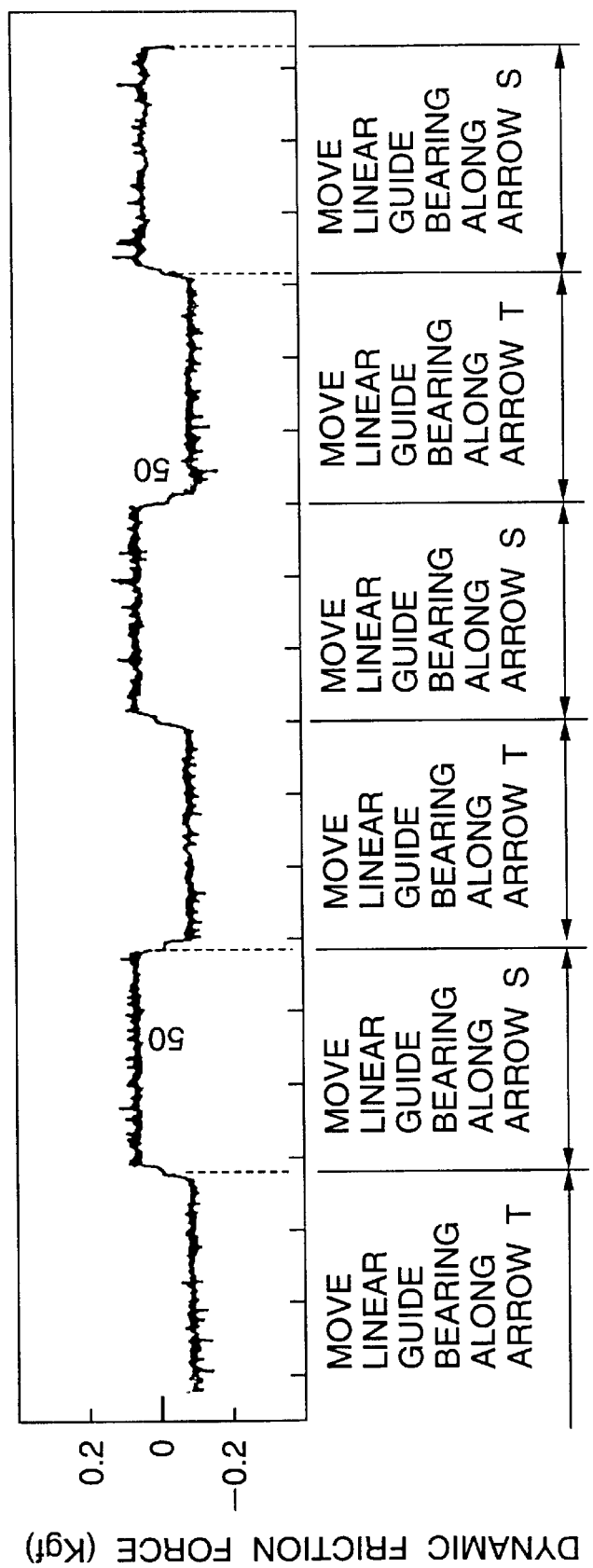
FIG. 3 is a graphical representation of an example of variations in the dynamical friction force of the linear guide bearing device according to the above embodiment.
Figure 9:
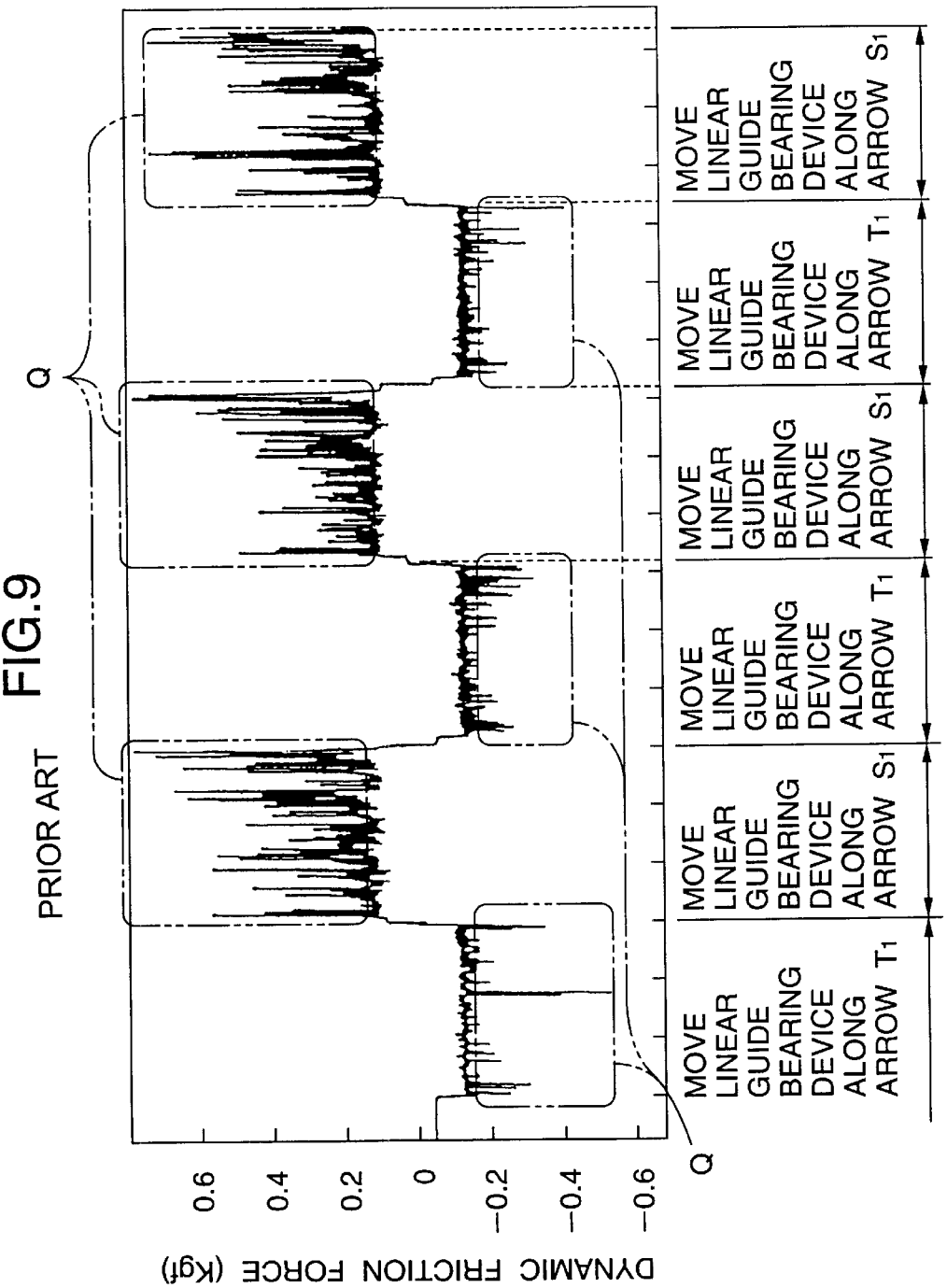
FIG. 9 is a graphical representation of an example of variations in the dynamical friction force of the conventional linear guide bearing device shown in FIG. 8.

Thanks to this, as shown in FIG. 3, not only the dynamical friction force of the slider 4, which is generated when the slider 4 moves along the guide rail 3, can be reduced considerably when compared with the dynamical friction force generated in the conventional linear guide bearing device 51 as shown in FIG. 9, but also variations in the present dynamical friction force can be controlled down to a substantially constant level.

By the way, in FIG. 3, the dynamical friction force, which is generated when the slider 4 is moved in one direction extending along an arrow line S shown in FIG. 2, is shown as a positive dynamical friction force; and, on the other hand, the dynamical friction force, which is generated when the slider 4 is moved in the other direction extending along an arrow line T shown in FIG. 2, is shown as a negative dynamical friction force.

Now, in the illustrated embodiment of the invention, there is shown a case in which a ball is used as the rolling element 10. However, this is not limitative but, for example, instead of the ball, as the rolling element 10, there can also be used a roller which is formed of steel or ceramics.

According to the invention, there is formed the expansion portion extending over each set of the load rolling passage and curved passage in such a manner that, between the take-up portion formed in the curved passage and the load rolling element that belongs to the load rolling elements respectively rolling with a load within their associated load rolling passage and is situated in the end portion of the present load rolling passage, there can be present an odd number of (for example, one or three) no-load rolling element (elements).

Thanks to this structure, the no-load rolling element moving into its associated curved passage is allowed to roll in a rotation direction in which the no-load rolling element is easy to move into the present curved passage. Therefore, the dynamical friction force generated when the slider moves along the guide member can be reduced as well as the variations in the present dynamic friction force can be controlled.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A linear guide device, comprising:

a guide member including a plurality of rolling element rolling grooves respectively formed in the outer surface thereof;

a slider disposed on said guide member and slideably movable along said guide member, said slider including a plurality of load rolling element rolling grooves respectively opposed to and combined with said rolling element rolling grooves of said guide member and cooperating with associated ones of said rolling element rolling grooves of said guide member in forming respective load rolling passages, and a plurality of curved passages respectively connected to said load rolling passages; and a plurality of rolling elements loaded in each of said load rolling passages and said curved passages, said rolling elements rolling with a load within associated ones of said load rolling passages and rolling with no load within associated ones of said curved passages, wherein, in an area ranging over each set of said load rolling passage and said curved passage, there is formed an expansion portion extending in a direction where said load rolling element rolling groove moves away from an associated one of said rolling element rolling grooves, said expansion portion being structured such that, between the load rolling element that belongs to said load rolling elements rolling with a load within said load rolling passages and is situated in the end portion of said load rolling passage and a rolling element take-up portion formed in each of said curved passages, there can be present an odd number of no-load rolling element rolling with no load.

2. The linear guide device according to claim 1, wherein said odd number is one.

* * * * *